US012606305B2

(12) United States Patent

Trotter et al.

(10) Patent No.: US 12,606,305 B2
(45) Date of Patent: Apr. 21, 2026

(54) ULTRALIGHT VENT SYSTEMS FOR AIRCRAFT FLUID DISPERSION TANKS

(71) Applicants: Victor D. Trotter, Fort Worth, TX (US); Timothy L. Cook, Haltom City, TX (US); Zachary A. Martin-Schoch, Fort Worth, TX (US); Martin P. Worden, Haltom City, TX (US)

(72) Inventors: Victor D. Trotter, Fort Worth, TX (US); Timothy L. Cook, Haltom City, TX (US); Zachary A. Martin-Schoch, Fort Worth, TX (US); Martin P. Worden, Haltom City, TX (US)

( * ) Notice: Subject to any disclaimer, the term of this patent is extended or adjusted under 35 U.S.C. 154(b) by 229 days.

(21) Appl. No.: 18/607,328

(22) Filed: Mar. 15, 2024

(65) Prior Publication Data

US 2025/0289571 A1 Sep. 18, 2025

Related U.S. Application Data

(63) Continuation-in-part of application No. 17/520,021, filed on Nov. 5, 2021, now Pat. No. 12,187,433.

(51) Int. Cl.
| | |
|---|---|
| *B64D 1/16* | (2006.01) |
| *F16K 24/06* | (2006.01) |
| *A62C 3/02* | (2006.01) |

(52) U.S. Cl.
CPC ............... *B64D 1/16* (2013.01); *F16K 24/06* (2013.01); *A62C 3/0235* (2013.01)

(58) Field of Classification Search
CPC ....... B64D 1/16; A62C 3/0228; A62C 3/0235; A62C 3/0242; F16K 24/06

USPC .......................................................... 169/53
See application file for complete search history.

(56) References Cited

U.S. PATENT DOCUMENTS

| | | | | |
|---|---|---|---|---|
| 1,604,290 | A | 10/1926 | King | |
| 1,673,087 | A * | 6/1928 | Morse | B64D 1/16 |
| | | | | 222/189.09 |
| 2,043,262 | A * | 6/1936 | Oglesby | B64D 1/16 |
| | | | | 244/136 |
| 2,924,040 | A | 2/1960 | White et al. | |
| 3,278,141 | A | 10/1966 | Wolcott | |

(Continued)

OTHER PUBLICATIONS

AT-802F, Drawing of rod-actuated vent, 1 page, shows rod-actuated vent that's been known and used by Air Tractor in US in year 2019 and earlier.

(Continued)

*Primary Examiner* — Cody J Lieuwen
(74) *Attorney, Agent, or Firm* — bobharter.com; Robert J. Harter

(57) ABSTRACT

In the field of agriculture and aerial firefighting, some example vent systems for aircraft fluid dispersion tanks include a combination of features that greatly minimizes the vent system's weight. Some examples of the vent system include a generally planar valve plug rigidly attached to a flexurally rigid but axially extendible strut. An upper end of the strut is suspended from a pivotal connector mounted centrally above the valve seat associated with the valve plug. As the vent closes, the pivotal connector ensures the valve plug can pivot into central alignment with the valve seat. In some examples, the valve plug includes a frusto-spherical outer perimeter to compensate for possible deviation in the connector's desired central alignment over the valve seat.

15 Claims, 16 Drawing Sheets

(56) References Cited

U.S. PATENT DOCUMENTS

| | | | | |
|---|---|---|---|---|
| 3,423,053 | A | 1/1969 | Hawkshaw | |
| 5,279,481 | A | 1/1994 | Trotter et al. | |
| 5,967,462 | A | 10/1999 | Foster et al. | |
| 8,365,762 | B1 | 2/2013 | Trotter | |
| 9,089,725 | B2 | 7/2015 | Gomez | |
| 10,350,441 | B2 | 7/2019 | Cordani et al. | |
| 11,046,433 | B2 | 6/2021 | Trotter | |
| 2011/0192934 | A1 | 8/2011 | Mark et al. | |
| 2012/0107630 | A1 | 5/2012 | Krishnaswamy et al. | |
| 2013/0126677 | A1 | 5/2013 | Mark et al. | |
| 2014/0000917 | A1* | 1/2014 | Stupakis | B64U 30/10 169/53 |
| 2020/0010196 | A1 | 1/2020 | Trotter | |
| 2020/0148358 | A1* | 5/2020 | Reabe | E05F 15/53 |
| 2021/0107630 | A1 | 4/2021 | Reabe | |
| 2023/0146980 | A1 | 5/2023 | Trotter | |

OTHER PUBLICATIONS

Transland Vent; Pivotal Vent, drawn by Marselos, torsion spring loaded, vacuum actuated, one page, dated Jul. 31, 2001.
Transland; Demand Vent; Engineering Drawing; spring-loaded translating vent, one page; dated Jul. 13, 2011.
International Search Report, issued in connection with PCT/US22/47347, mailed Jan. 31, 2023, 7 pages.
International Search Report; issued in connection with PCT/US2025/015354; mailed Apr. 17, 2025; 8 pages.

\* cited by examiner

FIG. 15

ULTRALIGHT VENT SYSTEMS FOR AIRCRAFT FLUID DISPERSION TANKS

CROSS REFERENCE TO RELATED APPLICATIONS

None

FIELD OF THE DISCLOSURE

This patent generally pertains to agricultural and firefighting product dispersal systems of aircraft and more specifically to means for venting the tanks that contain the product.

BACKGROUND

Some aircraft (e.g., airplanes and helicopters) are used as crop dusters or air tankers for agricultural and/or firefighting purposes. Such aircraft typically include a bulk container (e.g., a tank or a hopper) for carrying a flowable bulk product, such as dry fertilizer, liquid fertilizer, pesticide, fire extinguishing liquid, water, etc.

To selectively release the product, in some examples, a linkage assembly connects a manually operated lever in the cockpit to a movable gate at an outlet of the bulk container. The pilot operates the lever to open and close the gate, and thereby controls the release of the bulk product. When released, the bulk product is dispersed along the aircraft's trailing flight path. A vent near the top of the container can facilitate the release of product from the container.

BRIEF DESCRIPTION OF THE DRAWINGS

FIG. 15 is a cross-sectional side view similar to FIG. 7 but showing another example vent system constructed in accordance with the teaching disclosed herein, wherein the vent is shown closed.

DETAILED DESCRIPTION

Figure 1:
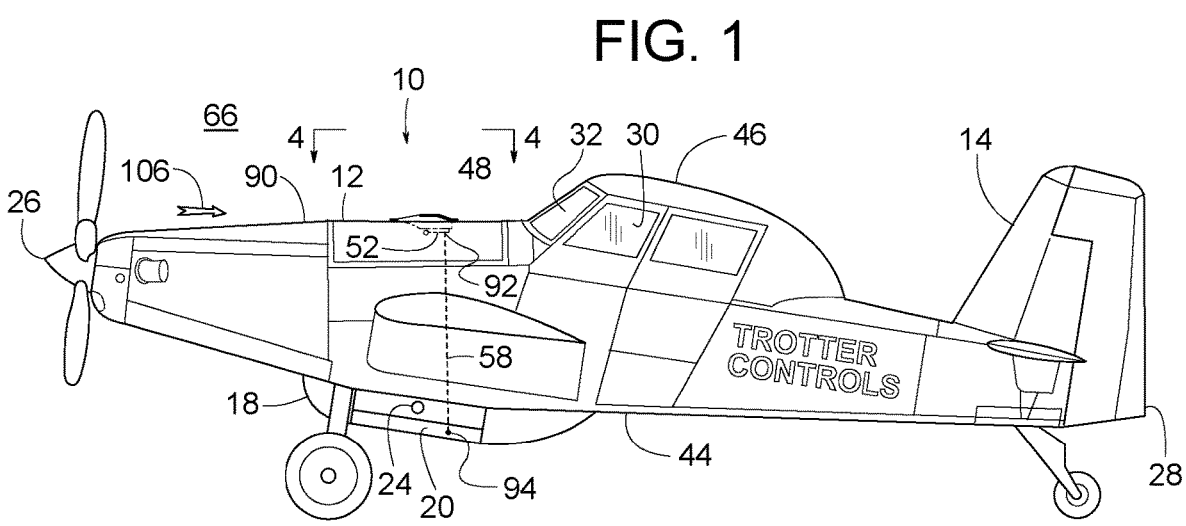
FIG. 1 is a side view of an example aircraft with an example vent system constructed in accordance with the teachings disclosed herein, wherein the vent system is shown closed.
Figure 2:
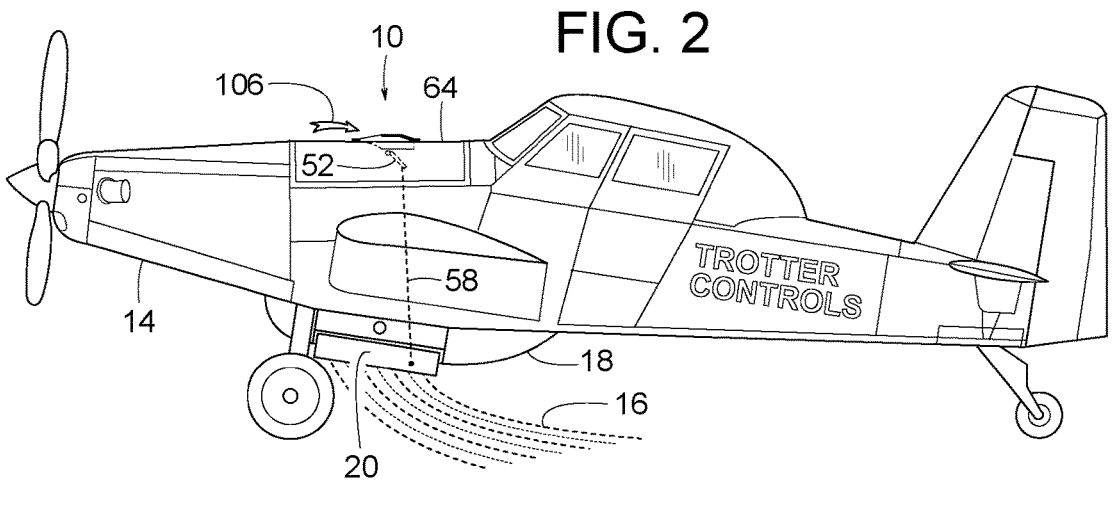
FIG. 2 is a side view similar to FIG. 1 but showing the aircraft dispersing fluid while the vent system is open.

FIGS. 1-9 pertain to a vent system 10 for a fluid dispersion tank 12 of an aircraft 14, wherein aircraft 14 is used for dispersing a fluid 16 or other flowable product while in-flight. A gate valve assembly 18 at the bottom of tank 12 includes at least one gate 20 that opens to release fluid 16 from tank 12. Gate 20 is movable between a closed position (FIGS. 1, 4, 5, 7, 11 and 12) to retain fluid 16 and an open position (FIGS. 2, 6, 8, 9, and 10) to release fluid 16. When gate 20 opens, it releases fluid 16 from tank 12 while vent system 10 prevents a detrimental vacuum from developing within tank 12. The released fluid 16 is dispersed along the aircraft's trailing flight path. Such a system is particularly suited for agricultural and firefighting purposes.

The term, "aircraft" refers to any flying machine. Some examples of aircraft 14 include an aerial crop duster, air tanker, an airplane, a helicopter, an Air Tractor AT402, an Air Tractor AT502, an Air Tractor AT602, an Air Tractor AT802A, an Air Tractor AT802F, a Thrush aircraft, and a Dromodier aircraft.

The term, "fluid" refers to any product or material that can flow. Some examples of fluid 16 include a liquid, granules, particles, seed, powder, water, chemical mixtures, fertilizer, pesticide, and fire retardant.

The term, "tank" refers to any hollow structure for containing a fluid. Some examples of tank 12 include a vessel, a hopper, a container, a receptacle, etc. In the illustrated examples, tank 12 defines a chamber 22 for containing fluid 16. In some examples, tank 12 is filled with fluid 16 through a fill valve 112 at a port 24 on either tank 12 or gate assembly 18.

The term, "gate" refers to any member that can be moved relative to an opening to vary the flow of a fluid through the opening or selectively stop (or substantially stop) the flow. Some example gates include plates, plugs, flaps, diaphragms, etc. Some example modes of gate movement include translating, pivoting, expanding, contracting, bending, and various combinations thereof. Some examples of gate assembly 18 include those disclosed in U.S. Pat. No. 11,046,433 and U.S. patent application Ser. No. 17/202,577 and Ser. No. 17/386,721; all of which are specifically incorporated herein by reference. In some examples, gate 20 is a 5-inch, 7.5-inch or 10-inch wide gate provided by Transland of Wichita Falls, Texas. In some examples, gate 20 is one of a series of gates in a gate assembly, wherein the gates open and close in unison. Gate 20 and gate assembly 18 are schematically illustrated in FIGS. 5-12.

Figure 3:
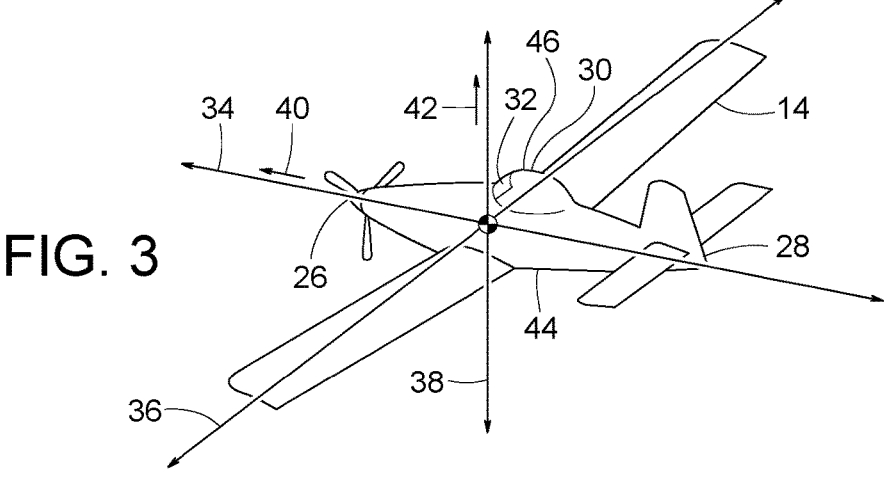
FIG. 3 is a perspective view showing various axes of an aircraft.
Figures 4, 5:
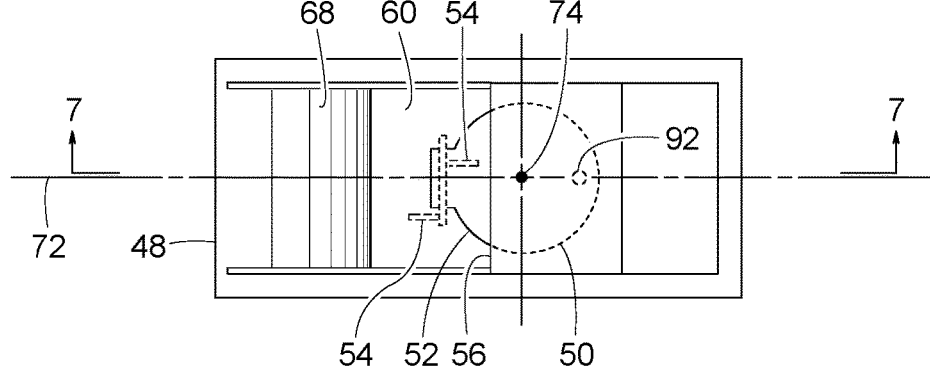
FIG. 4 is a cross-sectional view taken along line 4-4 of FIG. 1.
FIG. 5 is a perspective view of the example vent system shown in FIG. 1, wherein parts of a tank and gate valve assembly are schematically illustrated.
Figure 6:
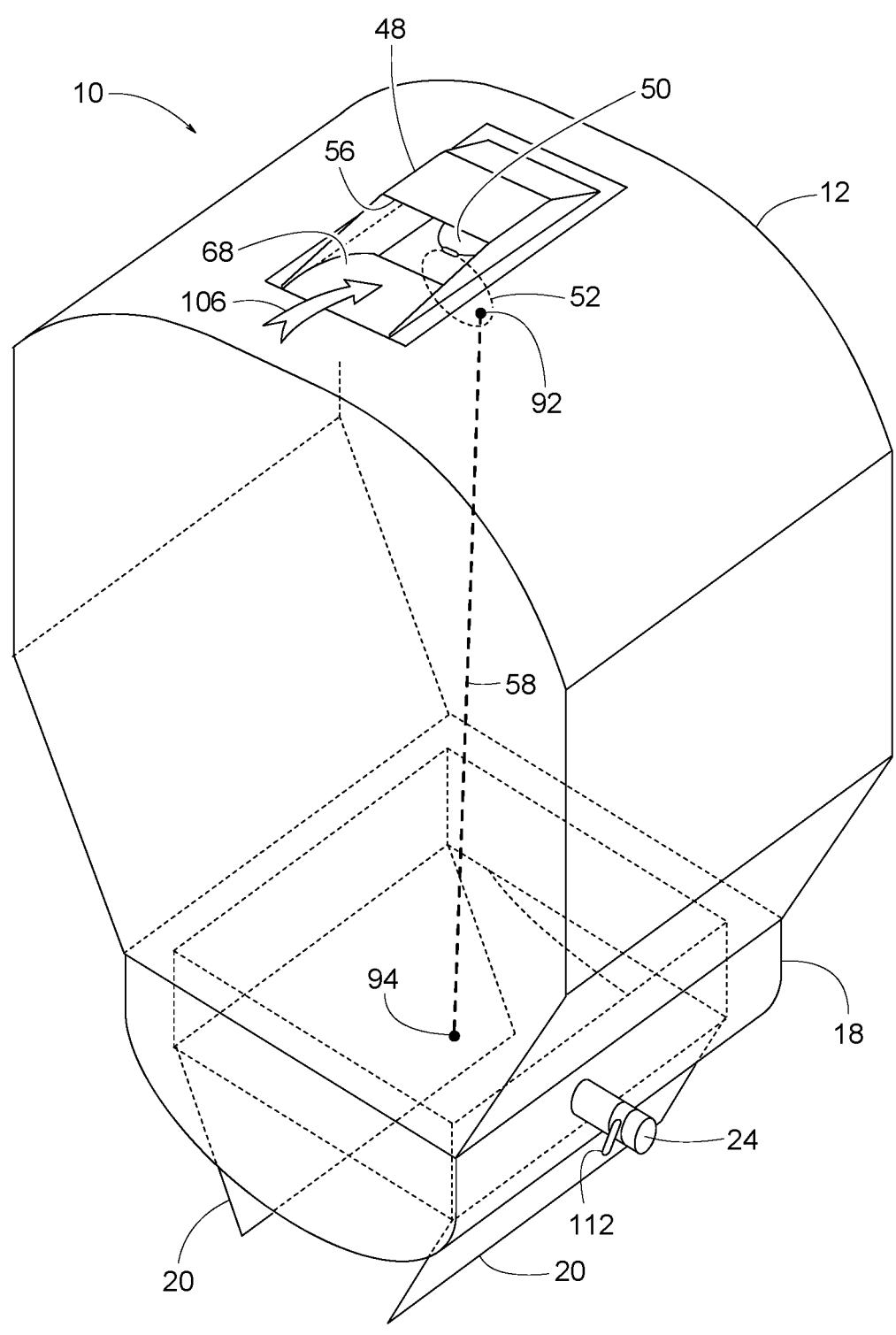
FIG. 6 is a perspective view similar to FIG. 6 but showing the vent system open.
Figure 7:
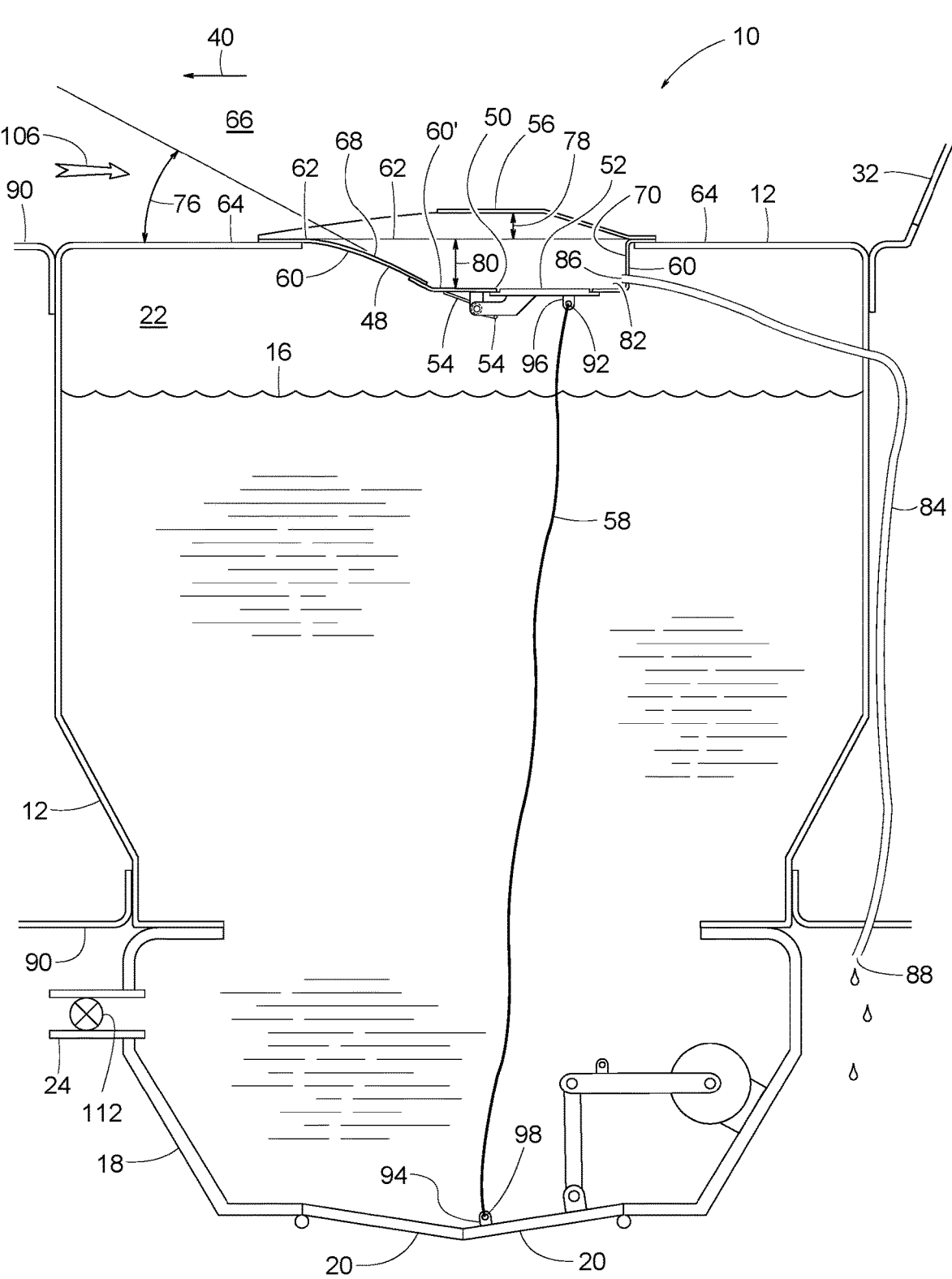
FIG. 7 is a cross-sectional side view of an example vent system constructed in accordance with the teachings disclosed herein.
Figure 8:
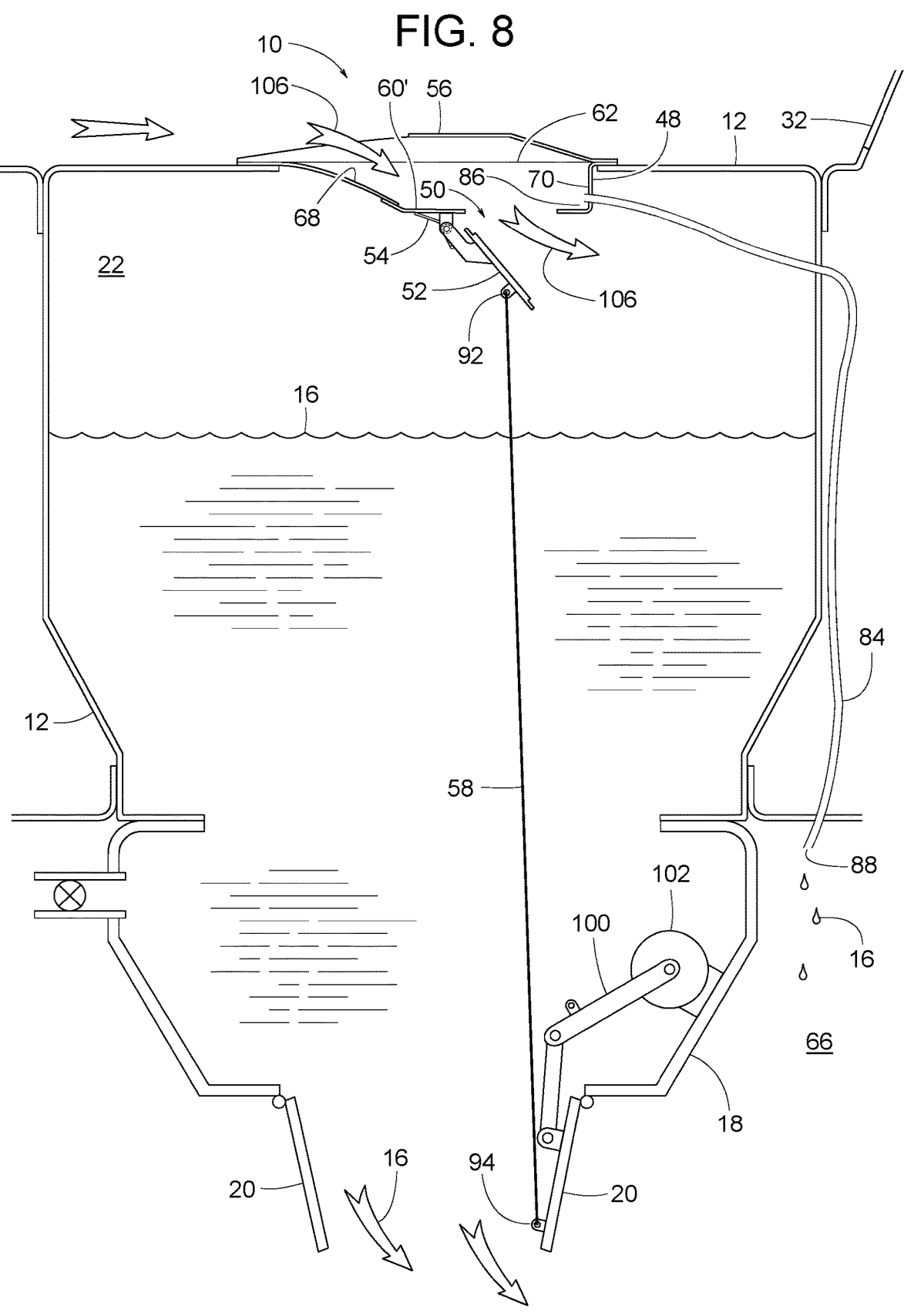
FIG. 8 is a cross-sectional side view similar to FIG. 7 but showing the vent system open while operating in a second mode of operation.

For describing physical orientations and relative positions, certain components of vent system 10 are described herein with reference to known orthogonal axes of aircraft 14, as shown in FIG. 3. FIG. 3 shows aircraft 14 comprising a nose 26, a tail 28, a cockpit 30, and a windshield 32. Aircraft 14 defines a roll axis 34, a pitch axis 36, and a yaw axis 38. Aircraft 14 extends lengthwise along roll axis 34 in a forward direction 40 from tail 28 to nose 26. Windshield 32 faces generally in forward direction 40. Aircraft 14 extends laterally widthwise along pitch axis 36. Aircraft 14 extends along yaw axis 38 in an upward direction 42 from a lower portion 44 of aircraft 14 to an upper portion 46 of aircraft 14. Cockpit 30 is between tail 28 and nose 26 with respect to roll axis 34. Roll axis 34, yaw axis 38, and pitch axis 36 lie perpendicular to each other.

In some examples, vent system 10 comprises a vent 48 defining an aperture 50 through tank 12, a vent member 52 for selectively opening and blocking aperture 50, a vent closure spring 54 for urging vent member 52 to a closed sealed position (FIGS. 1, 4, 5, and 7), a scoop 56 extending at least partially over aperture 50, and a slender member 58 coupling vent member 52 to gate valve assembly 18. The term, "vent member" refers to any structure for selectively blocking and unblocking an aperture. A few examples of vent member 52 include a plate, a disc, a plug, a diaphragm, a ball, a flap, a cone, a partially spherical body, etc. Some example modes of vent member movement include translating, pivoting, expanding, contracting, bending, and various combinations thereof.

Some examples of vent 48 comprise an inlet well 60 extending down into the tank's chamber 22 toward the vent's aperture 50. Inlet well 60 has a brim 62 at an upper surface 64 of tank 12. Brim 62 is the outer periphery of inlet-well 60. In some examples of vent 48, a lower end 60' of inlet-well 60 defines aperture 50 between the tank's chamber 22 and an outside atmosphere 66 surrounding aircraft 14. In some examples, inlet-well 60 includes an upstream surface 68 and a downstream surface 70. Aperture 50 and downstream surface 70 are behind upstream surface 68 with respect to the forward direction 40 along roll axis 34. In some examples, upstream surface 68 extends downward from brim 62 toward aperture 50, and downstream surface 70 extends upward from aperture 50. In some examples, inlet well 60 is 3D printed and is comprised of carbon fiber reinforced polypropylene.

In some examples, upstream surface 68 is sloped more gradually than downstream surface 70, as viewed along an imaginary plane 72, wherein imaginary plane 72 is defined as intersecting a centerpoint 74 of aperture 50 and lying perpendicular to pitch axis 36. In some examples, the aperture's centerpoint 74 is laterally centered relative to aircraft 14 and roll axis 34. In other examples, the aperture's centerpoint 74 is laterally offset to the left or right of roll axis 34. Some examples of vent system 10 include two vents 48 or 48' on either side of roll axis 34. Some examples of vent system 10 include more than two vents 48 or 48'.

In some examples, the gradual slope of upstream surface 68 promotes a beneficial Coanda effect, whereby upstream surface 68 tends to draw air to itself and thereby effectively direct that air down toward aperture 50. In some examples, upstream surface 68 curves smoothly along imaginary plane 72 to gradually direct the airflow downward. In some examples, upstream surface 68 is substantially linear along imaginary plane 72 to simplify manufacturing of vent 48. In some examples, upstream surface 68 lies at an acute angle 76 of less than 45 degrees to roll axis 34 to promote the Coanda effect.

Inlet-well 48 placing aperture 50 at a recessed elevation below the tank's upper surface 64 in combination with the Coanda effect enables vent 48 to draw an ample amount of air down through aperture 50 and into tank 12 without creating a prominent upward protrusion that could otherwise significantly obstruct a pilot's view. In some examples, however, a relatively low-profile scoop 56 can be added to increase the airflow through aperture 50 and to help shield windshield 32 from backsplash when vent 48 is open.

Figure 10:
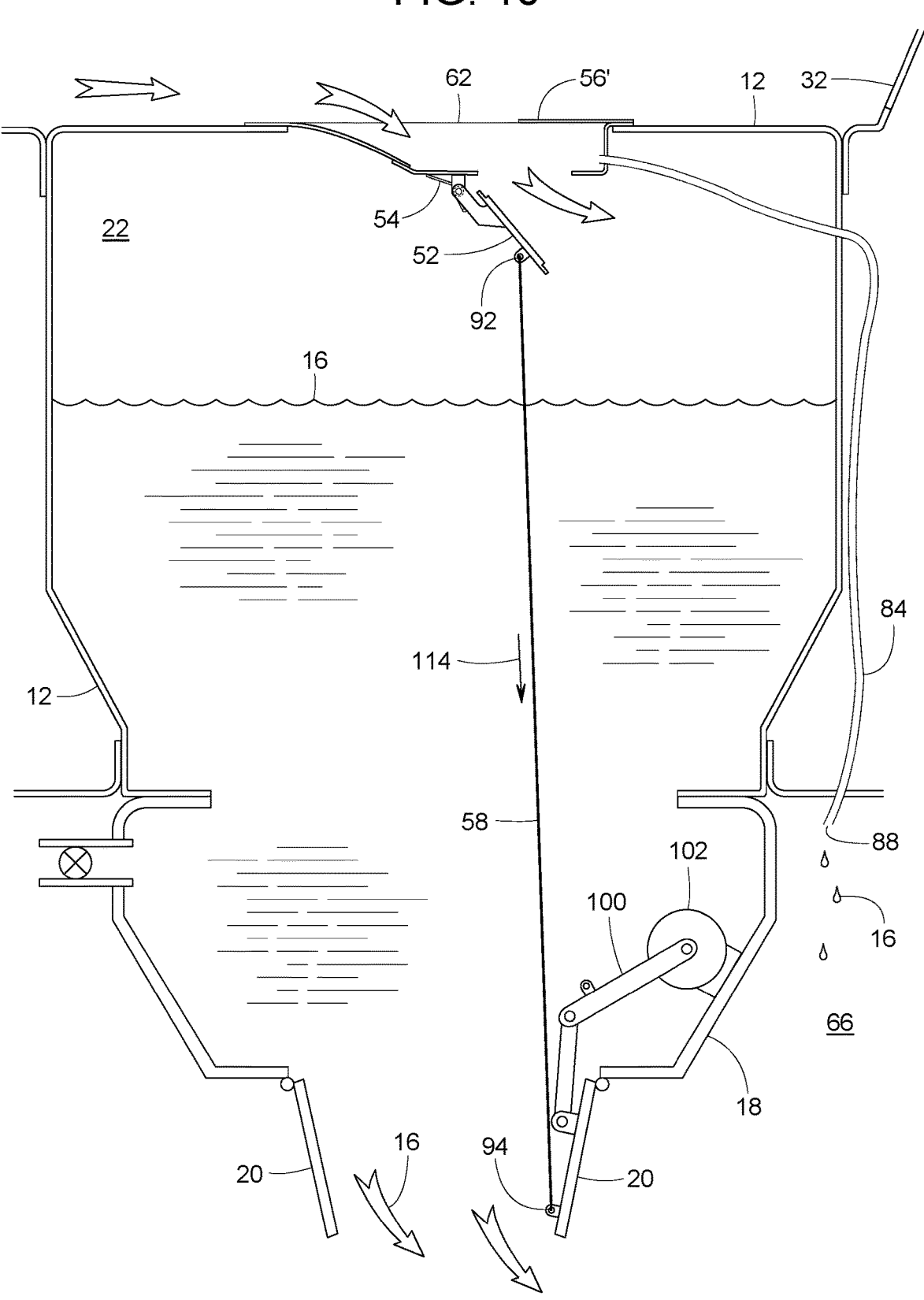
FIG. 10. is a cross-sectional side view similar to FIG. 8 but showing an even lower profile vent system constructed in accordance with the teachings disclosed herein.

To minimize obstructing the pilot's view, some examples of scoop 56 extend only a certain height 78 above brim 62, wherein certain height 78 is less than a well-depth 80 of inlet-well 60. In some examples, well-depth 80 is preferably at least one inch lower than brim 62 to realize the benefit of a recessed vent. In some examples, the certain height 78 is less than three inches to avoid creating a significant obstruction to the pilot's view. In some examples, the scoop's certain height 78 is less than two inches, and well-depth 80 is greater than two inches to provide a good compromise between vent inlet airflow and minimal obstruction to the pilot's view. In some examples, the scoop's height 78 is about 1.5 inches, and well-depth 80 is about three inches for best results. To realize at least a minimal benefit of aperture 50 being recessed, inlet-well 60 at aperture 50 is at least one inch lower than brim 62. In some examples, as shown in FIG. 10, a scoop 56' has a certain height 78 that is substantially equal to zero (i.e., scoop 56' is substantially flush with brim 62).

To further increase vent airflow while reducing backsplash, some examples of scoops 56 and 56' extend in forward direction 40 out over aperture 50. With the addition of scoop 56 or 56', some backsplash of fluid 16 might collect in a lower rear area 82 of vent-well 60. In some examples, a drain tube 84 can be used for draining this collection of fluid 16.

In some examples, drain tube 84 has an inlet 86 and an outlet 88. Inlet 86, in some examples, is in fluid communication with inlet-well 60 at a point in lower rear area 82 above aperture 50 and below brim 62. In some examples, the drain tube's outlet 88 is below the tube's inlet 86 and below aperture 50. In some examples, drainage of fluid 16 through drain tube 84 is directed back into tank 12, directed down into a separate waste collection tank, or simply released into the surrounding atmosphere 66. The term, "tube" refers to any fluid passageway. Some examples of a tube include a pipe, a hose, a conduit, a drilled hole, a channel, a gutter, and various combinations thereof.

In some examples, to reduce assembly costs and avoid leakage points, inlet-well 60 is integrally formed seamlessly in the tank's upper surface 64. In such examples, inlet-well 60 and the tank's upper surface 64 are both made of the same material. In some examples, the tank's upper surface 64 is part of a lid that is hinged to the rest of tank 12, whereby the hinged lid provides access to chamber 22.

In some examples, tank 12 adjoins a cowl or fuselage 90 of aircraft 14. The fuselage 90 is the aircraft's basic structural framework, and the cowl can be certain covers of the aircraft 14. In some examples, the cowl or fuselage 90 is comprised of a first material (e.g., aluminum alloy), tank 12 and inlet-well 60 are each comprised of a second material (e.g., a polymer, fiberglass, or some other composite), and the first material is different than the second material. The two materials being different from each other allow the use of optimal materials each being uniquely suitable for an aircraft cowl or fuselage and a tank's wall.

In some examples, vent closure spring 54 urges vent member 52 to its closed position. Vent closure spring 54 is schematically illustrated to represent any resilient member capable of urging vent member 52 to its closed position. Some examples of vent closure spring 54 include a torsion spring, a compression spring, an extensions spring, a leaf spring, a constant force spring, an elastic cord, an elastic strap, a pneumatic spring, a bellows, etc. In some examples, a certain level of vacuum (e.g., −0.5 psig) in chamber 22 overcomes vent closure spring 54 and thereby forces vent member 52 to its open position. A vacuum of −0.5 psig, however, can delay the release of fluid 16 out from within tank 12.

To overcome this problem, some examples of vent system 10 include slender member 58. The term, "slender member" refers to any elongate structure having a length that is at least ten times greater than its width. Some examples of slender member 58 are rigid. Other examples of slender member 58 are more flexible or pliable. Some examples of slender member 58 include a cable, a chain, a nylon strap, an elastic strap, an extension spring, a wire, a rope, a cord, a rod, a bar, a linkage, a linkage assembly, a tube, and various combinations thereof.

In some examples, slender member 58 couples vent member 52 to gate valve assembly 18 such that gate 20 moving between the closed position and the open position causes vent member 52 to move respectively between its sealed position and the unsealed position. In some examples, vent closure spring 54 holds vent member 52 at the sealed position when gate 20 is in its closed position. In some examples, slender member 58 overpowers vent closure spring 54 to force vent member 52 to its unsealed position when gate 20 is in the open position.

In some examples, when gate 20 is in the closed position, slender member 58 is slack (FIGS. 5 and 7), which allows vent closure spring 54 to close vent member 52 without appreciable resistance from slender member 58. In some examples, when gate 20 is in the open position, slender member 58 is taut (FIGS. 6, 8, and 9) and forces vent member 52 to its unsealed position.

It should be appreciated by those of ordinary skill in the art that points 92 and 94 to which slender member 58 respectively connects to vent member 52 and gate valve assembly 18 can be at any suitable locations. In some examples, point 92 is on a lug 96 extending from vent member 52. In some examples, point 94 is on a lug 98 extending from gate 20, as shown in FIGS. 5, 6, 7, and 8. In some examples, as shown in FIG. 9, point 94 can be attached to a link 100 connecting gate 20 to a gate actuator 102.

Gate actuator 102 is schematically illustrated to represent any means for powering the movement of gate 20. Some examples of gate actuator 102 include a motor, a hydraulic cylinder, a gearbox, a linkage assembly, and various combinations thereof. In some examples, a linkage assembly, gears, or some other mechanism couples multiple gates 20 to gate actuator 102, so the multiple gates 20 open and close in unison.

Figure 9:
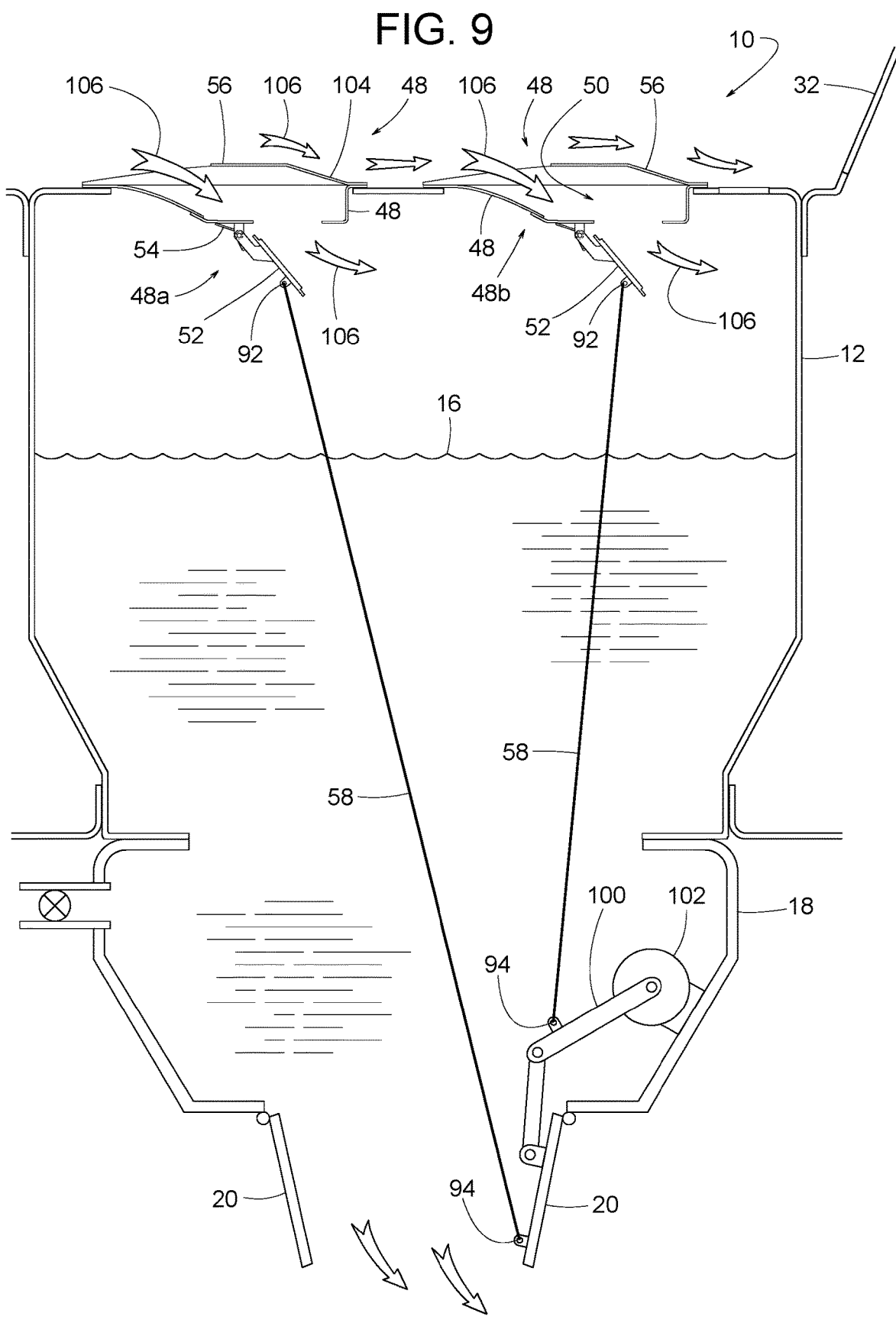
FIG. 9 is a cross-sectional side view similar to FIG. 8 but showing the scoop of an upstream vent directing air into a downstream vent.

In some examples, vent system 10 includes two or more vents 48, as shown in FIG. 9. In some examples, vent system 10 includes a front vent 48*a* and a rear vent 48*b*. In some examples, each vent 48*a* and 48*b* are substantially identical to vent 48. Vents 48*a* and 48*b* have a strategic tandem arrangement such that an upper surface 104 of the front vent's scoop 56 utilizes the Coanda effect to direct air 106 into an inlet 50 of the rear vent 48*b*. In some examples, rear vent 48*b* can capture backsplash that might escape front vent 48*a*, thus minimizing the amount of backsplash that might otherwise reach windshield 32.

Figure 11:
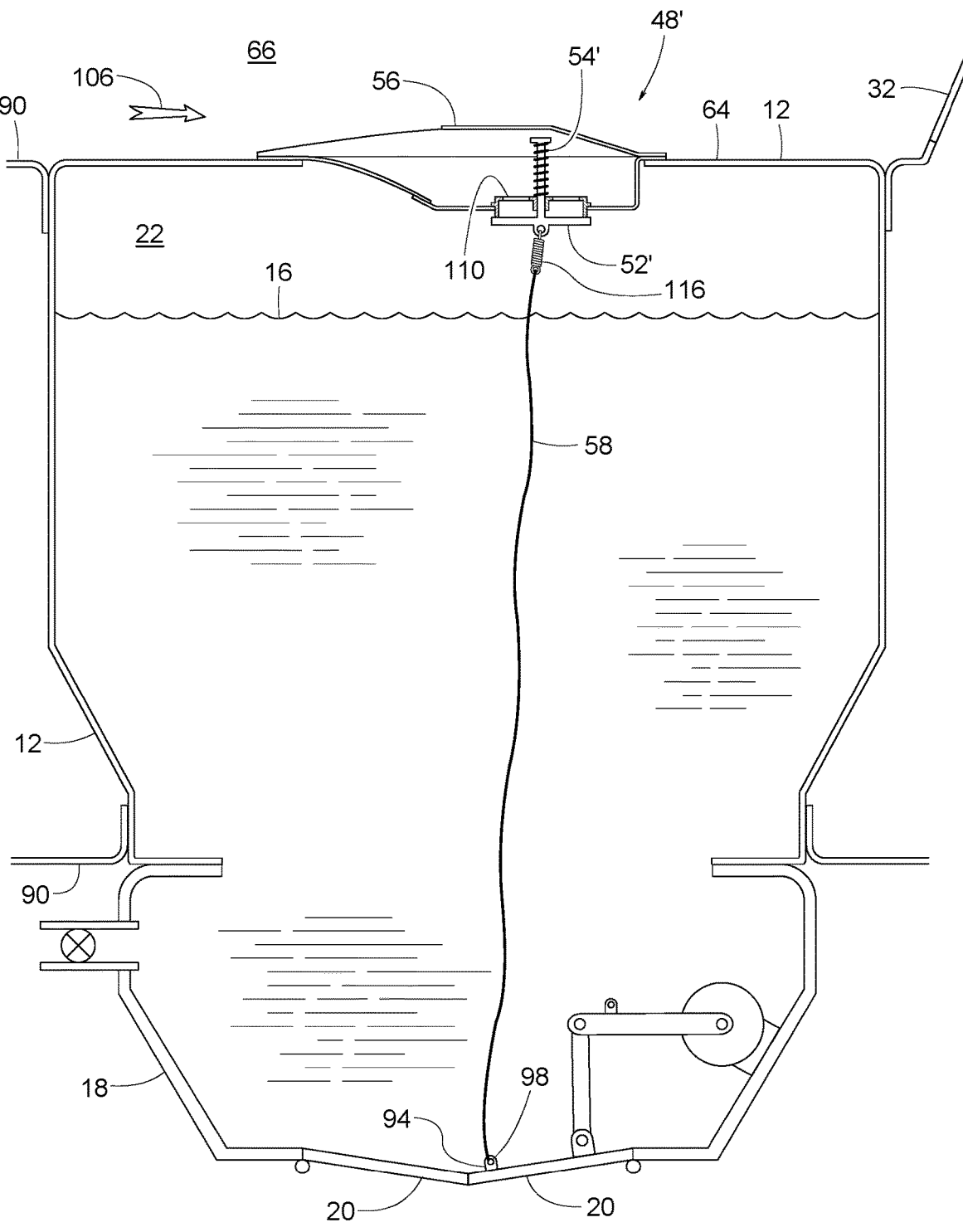
FIG. 11 is a cross-sectional side view similar to FIG. 7 but showing another example vent constructed in accordance with the teachings disclosed herein.
Figure 12:
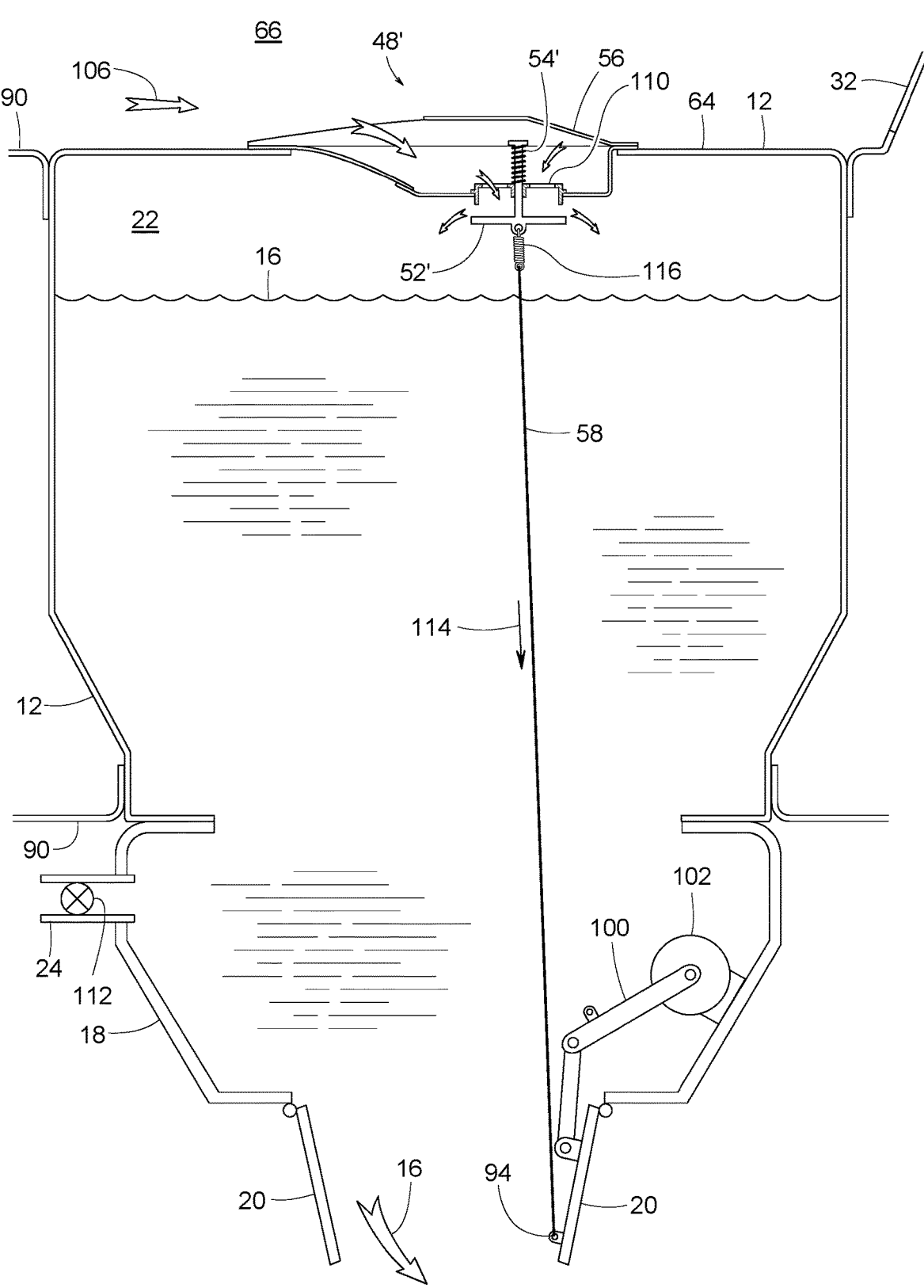
FIG. 12 is a cross-sectional side view similar to FIG. 11 but showing the vent in an unsealed position while operating in a second mode of operation.

In the example shown in FIGS. 11 and 12 an example vent member 52' in the form of a vertically translating plate and an example vent closure spring 54' is in the form of a compression spring. Vent closure spring 54' urges vent member 52' to its sealed position (FIG. 11). When gate 20 opens, slender member 58 pulls vent member 52' to its unsealed position (FIG. 12). In some examples one or more spokes 110 help position vent member 52' in a radial direction. In some examples, to achieve sufficient ventilating airflow, the vertical travel distance of vent member 52' is at least twenty percent of the vent member's outer diameter. In some examples, the vertical travel distance of vent member 52' is about 2.5 inches.

Figure 13:
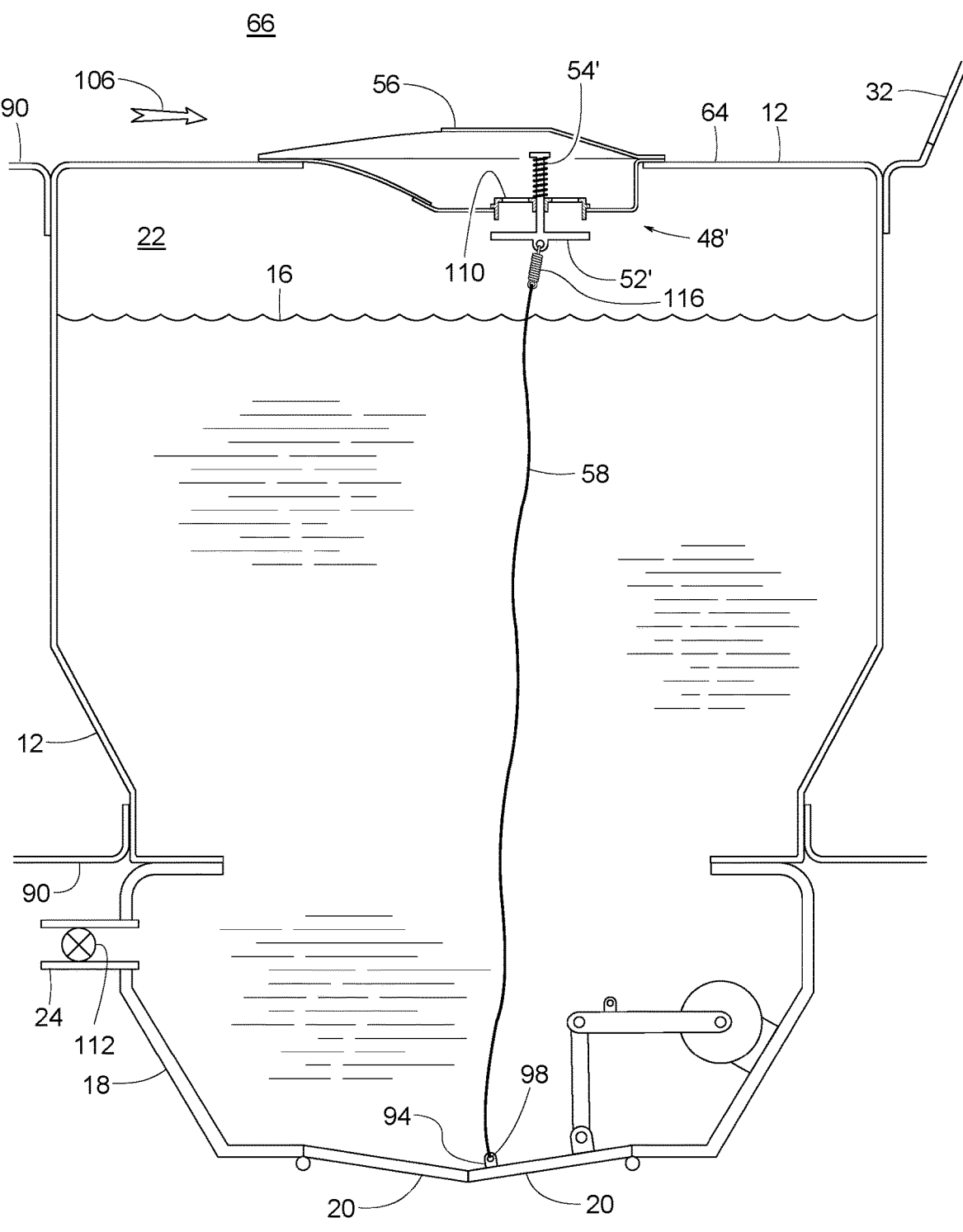
FIG. 13 is a cross-sectional side view similar to FIG. 11 but showing the vent system operating in a first mode of operation.
Figure 14:
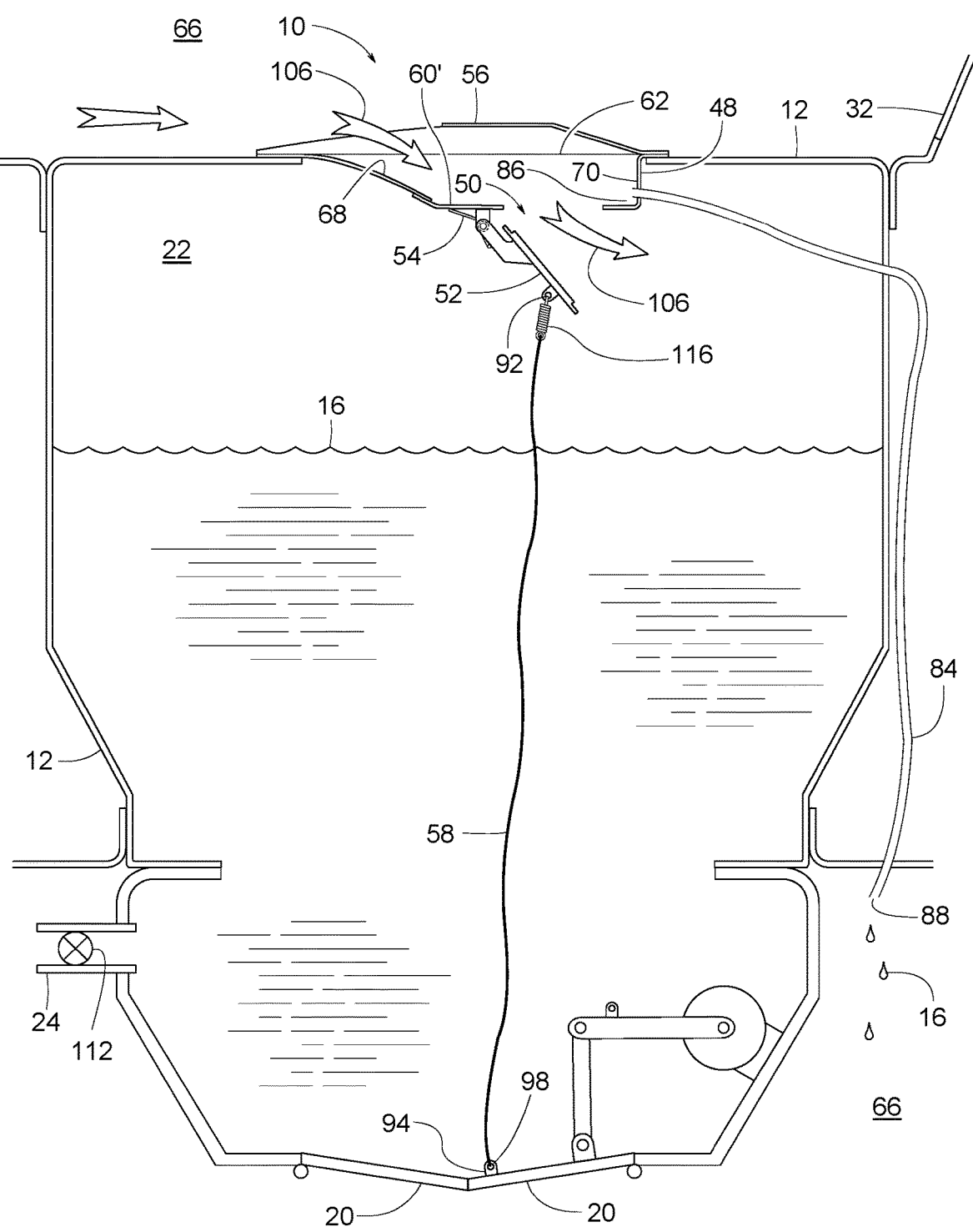
FIG. 14 is a cross-sectional side view similar to FIG. 7 but showing the vent system operating in a first mode of operation.

In addition or alternatively, some examples of vent system 10 have two modes of operation, e.g., a first mode and a second mode. Examples of first mode are shown in FIGS. 13 and 14. Examples of second mode are shown in FIGS. 2, 6, 8, 9 and 10.

In some examples of the first mode, vent member 52 or 52' of vent 48 or 48' moves independent of gate 20 from the sealed position to the unsealed position in response to the chamber pressure (i.e., the air pressure in chamber 22) decreasing a predetermined amount below the atmospheric pressure. In some examples, the predetermined amount is 0.8 psig below atmospheric pressure (i.e., −0.8 psig). So, in some examples, if the air pressure differential across vent member 52 or 52' reaches or exceeds 0.8 psig (at least 0.8 psig of vacuum in chamber 22), then the pressure differential will open the vent. In some examples, the predetermined amount is between about 1.5 psig to 2 psig below atmospheric pressure.

Such a first mode of operation helps avoid collapsing or otherwise damaging tank 12 under certain adverse pressure conditions. For instance, in some cases, fill valve 112 or gate 20 might leak. The lost fluid 16 could create excessive vacuum in chamber 22. In other cases, changes in elevation of aircraft 14 might create an adverse vacuum in chamber 22.

As a means for preventing damagingly high vacuum from developing within chamber 22, the first mode of operation allows vent member 52 and 52' to open independent of gate 20. So, in the first mode, vent members 52 and 52' can move regardless of whether gate 20 is open or closed.

In the second mode, vent members 52 and 52' can move independent of the chamber pressure from the sealed position to the unsealed position in response to gate valve assembly 10 applying a predetermined amount of tension 114 to slender member 58. The predetermined amount of tension 114 is that which is needed to overcome the force of vent closure spring 54 or 54'.

The second mode allows vent members 52 and 52' to open even when there is no pressure differential between the air pressure in chamber 22 and the outside atmosphere. The second mode of operation allows aircraft 14 to release fluid 16 at a maximum fluid flow rate, as vent system 10 does not require a vacuum or −0.5 psig in chamber 22 in order to function properly.

To prevent accidentally damaging vent system 10, some examples of slender member 58 include a tension-limiting spring 116 (e.g., an extension spring). Tension-limiting spring 116 can be installed anywhere along the length of slender member 58. If for some reason slender member 58 tries to exert excessive pulling force on vent member 52 or 52', tension-limiting spring 116 will yield (resiliently extend) to limit the slender member's pulling force (tension 114). Tension-limiting spring 116, for example, prevents an installer or mechanic from adjusting slender member 58 so tightly that it damages vent system 10. Under normal operation, tension-limiting spring 116 remains unextended regardless of whether vent system 10 is open or closed.

FIGS. 15-22 show an example vent system 10' with a strategic choice of materials and novel means of operation that together provide the vent system 10' with an ultralight construction. In the illustrated example, the vent system 10' comprises the tank 12 (or hopper) with the chamber 22 for containing the fluid 16, the gate valve assembly 18 with at least one gate 20 for selectively releasing the fluid 16, a vent frame 118 at an upper area 120 of the tank 12 above the gate valve assembly 18, a valve seat 122 defining an aperture 124, a brace 126, a hood 128, a strut 130, a connector 132, a valve plug 134, and the slender member 58.

The slender member 58 of the vent system 10' connects a lower end 136 of the strut 130 (e.g., at point 92) to the gate valve assembly 18 (e.g., at point 94). It should be appreciated by those of ordinary skill in the art that points 92 and 94 can be at any suitable locations. In some examples, point 92 is on a clevis 138 at the strut's lower end 136.

In some examples, point 94 is on a lug 98 extending from the gate 20. In some examples, point 94 can be attached to a link 100 connecting gate 20 to a gate actuator 102. The gate 20, the link 100, the gate actuator 102, and the entire gate valve assembly 18 are schematically illustrated, thus point 94 can be on any moving part associated with the gate valve assembly 18.

The gate valve assembly 18 includes the gate 20 and various hardware components associated with operating the gate 20. Some examples of such hardware components include levers, arms, shafts, gearboxes, hydraulic cylinders, electric linear actuators, other types of actuators, motors, gears, racks, pinions, rods, cables, chains, linkages, cranks, bell cranks, etc.

The vent frame 118 is what supports the valve seat 122 and related components of the vent system 10'. In some examples, vent frame 118 is made of sheet metal comprising a stainless steel alloy (e.g., stainless steel 304 or 308). Stainless steel provides corrosion resistance, and sheet metal provides the benefit of lightweight construction.

In some examples, a series of fasteners 140 (e.g., screws, bolts, nuts, rivets, etc.) fasten the vent frame 118 to a hatch cover 142, which in turn is fastened to the tank 12 and/or the fuselage 90. In some examples, the vent frame 118 is fastened directly to the tank 12 without the hatch cover 142. In some examples, the hatch cover 142 is made of plastic, fiberglass or some other composite for durability, corrosion resistance or to minimize weight.

In some examples, the series of fasteners 140 connects an outer periphery 144 of the hatch cover 142 to the tank 12. In some examples, another series of fasteners 140 connects an inner periphery 146 of the hatch cover 142 to the vent frame 118. In some examples, the vent frame 118 is fastened to an underside 145 of the hatch cover 142 for appearance and aerodynamics. The fasteners 140 enable disassembly for maintenance or replacement of various vent system components.

The term, "tank" means one or more tanks. In some examples a single vent system 10' serves two adjacent tanks 12 mounted in a single aircraft 14.

The term, "fastened" as it relates to connecting at least two parts means that a plurality of mechanical fasteners hold the two parts together, either in intimate contact with each other or with some spacer or gasket therebetween. Some examples of a plurality of mechanical fasteners include screws, nuts, bolts, rivets, etc.

The valve seat 122, in some examples, is a flat rubber ring with its inner diameter (e.g., about 29 cm) defining the aperture 124. In some examples, the valve seat 122 is made of Buna-N (acrylonitrile butadiene, nitrile, NBR) with a durometer of 50-60 Shore-A. Such a material is sufficiently compliant to flex axially and sealingly conform to the valve plug 134. In some examples, additional fasteners 140 axially clamp the valve seat 122 to the vent frame 118.

The hood 128 extending at least partially over the aperture 124 helps direct the outside atmospheric air 66 into the vent system 10'. In some examples, the hood 128 is made of stainless steel sheet metal to resist corrosion and minimize weight. In some examples, the brace 126 extends over the aperture 124 to help support the hood 128. In some examples, the brace 126 is made of stainless steel sheet metal to resist corrosion, minimize weight and minimize wind drag.

Figure 15:
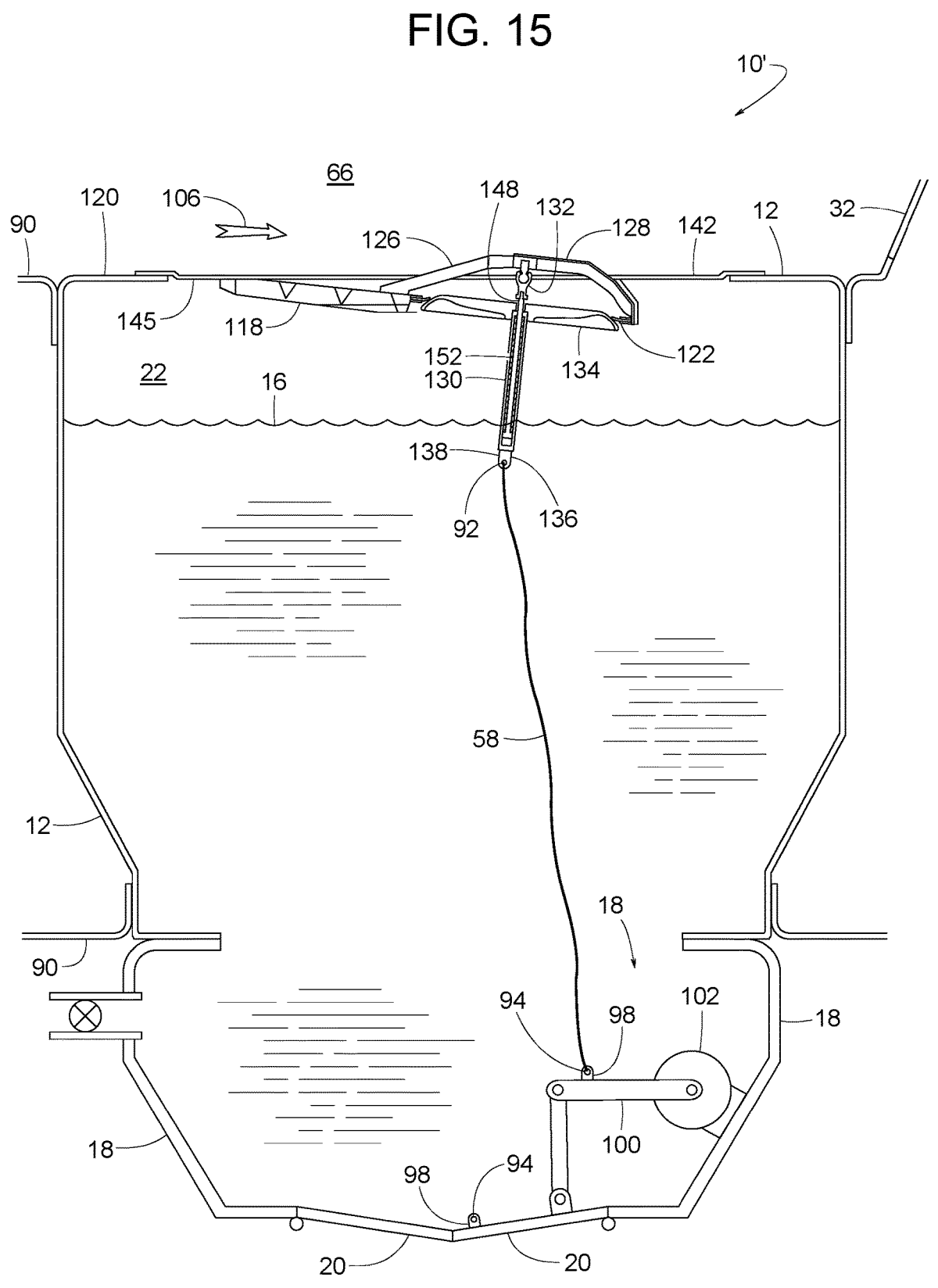
Figures 20, 21, 22:
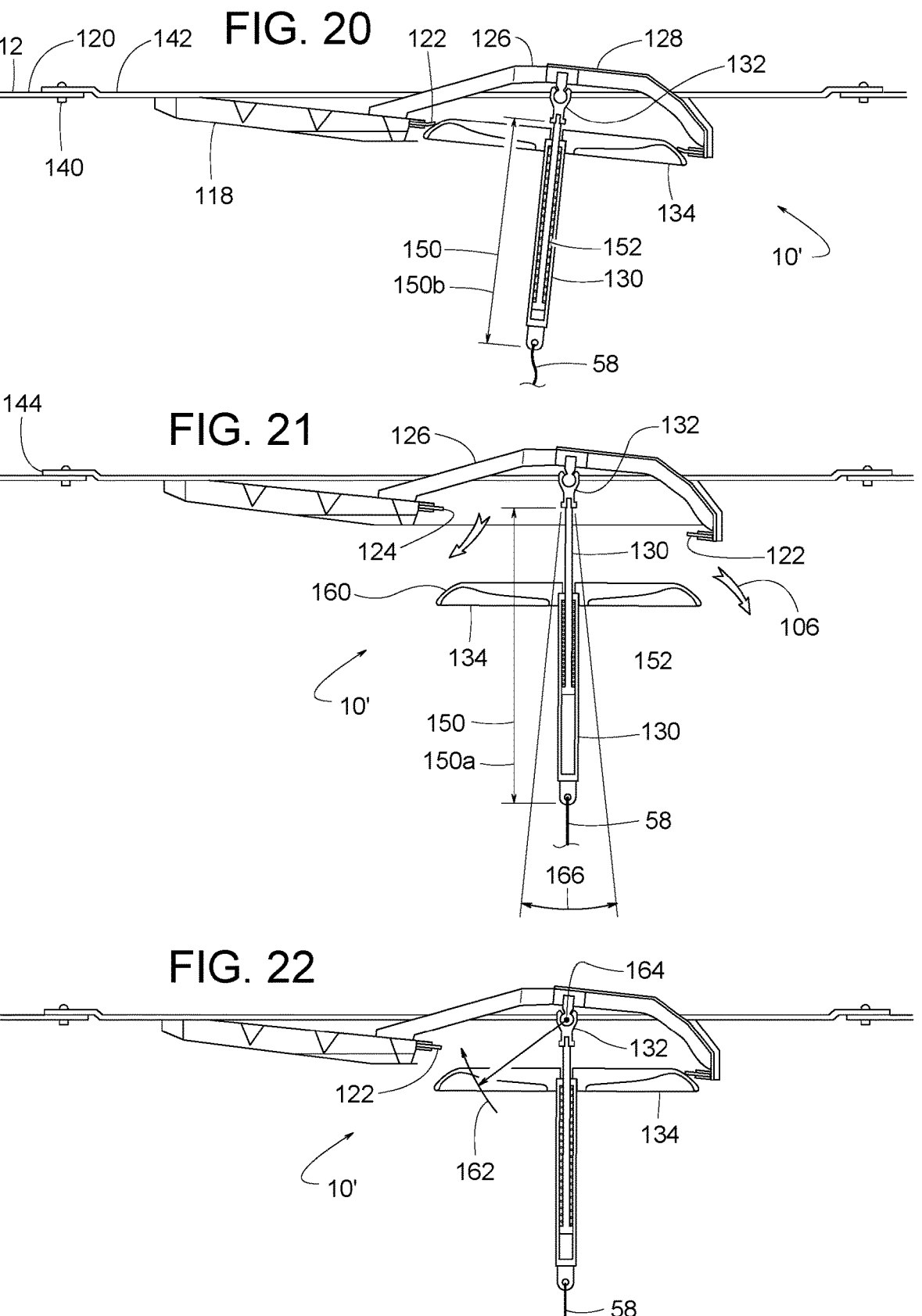
FIG. 20 is a cross-sectional side view of the vent system shown in FIG. 21 but showing the vent closed.
FIG. 21 is a cross-sectional side view taken along line 21-21 of FIG. 18.
FIG. 22 is a cross-sectional side view similar to FIGS. 20 and 21 but showing the valve plug about to be closed completely.

In some examples, the brace 126 also provides a sturdy mounting structure to which an upper end 148 of the strut 130 can be attached by way of the connector 132. In some examples, the strut 130 is flexurally rigid but telescopically extendable to provide the strut 130 with a variable length 150 (e.g., lengths 150a and 150b). In some examples, the strut 130 includes a spring 152 that urges the strut 130 from its extended length 150a (FIGS. 16, 18, 19 and 21) to its retracted length 150b (FIGS. 15 and 20). In some examples, the spring 152 acts between an inner rod 130a and an outer cylinder 130b of the strut 130. Some examples of the spring 152 include an extension spring, a compression spring, and a gas spring. In some examples, the strut 130 is an M-STRUTS extension strut (e.g., item 19MT55, MSCO4000150122S) made of stainless steel and sold by W. W. Grainger of Lake Forest, Illinois.

In some examples, the valve plug 134 is rigidly attached to strut 130. The rigid attachment ensures that a plane 154 of the valve plug 134 remains perpendicular to the strut 130 regardless of whether the vent is open or closed. To minimize weight, some examples of the valve plug 134 are generally planar and non-buoyant, rather than being a large spherical ball. In some examples, to minimize weight, the valve plug 134 has a plug mass (e.g., about 0.77 kg), a plug thickness 156 (e.g., about 2.8 cm), a plug outer diameter 158 (e.g., about 31.3 cm), and a plug ratio of greater than five, wherein the plug ratio is the plug outer diameter 158 divided by the plug thickness 156. In some examples, the valve plug 134 can be cast and/or machined of an aluminum alloy (e.g., 6061-T651, etc.). In some examples, the valve plug 134 is 3D printed of plastic. In some examples, the valve plug 134 can be plastic injection molded or machined plastic. In some examples, the valve plug 134 has a plug mass (e.g., about 0.77 kg) to provide the valve plug 134 with a diameter/mass ratio of the plug outer diameter 158 divided by the plug mass that is greater than twenty cm/kg. In some examples, a combination of the vent frame 118, the valve seat 122, the brace 126, the hood 128, the strut 130, the connector 132 and the valve plug 134 has a combined weight of less than 12 kg.

In some examples, the valve plug 134 includes a frusto-spherical structure 160 (section of a sphere) along the valve plug's outer periphery. In other examples, the valve plug 134 includes a frustoconical structure 160 (section of a cone). The shape of the structure 160, frusto-spherical or frusto-conical, ensures positive sealing engagement with the valve seat 122.

In some examples, either shape will work because the rigidity of the strut 130 in combination with the connector 132 being radially centered over the aperture 124 ensures that the valve plug 134 will likewise be centered within the valve seat 122 and not tilted when closed. Some tilting might occur in the process of closing, as shown in FIG. 22, but as the vent closes, the valve plug 134 will naturally shift (arrow 162) about the connector's center of rotation 164 to become square and true with the valve seat 122, as shown in FIG. 20. In examples where the connector 132 is of loose tolerance or not perfectly centered over the aperture 124, a frusto-spherical shape can be better than a frustoconical one in compensating for such deviations.

In some examples, the connector 132 is pivotal about the center of rotation 164, thus the valve plug 134 is pivotal about the center of rotation 164 as well. In some examples, the connector 132 renders the strut 130 and attached valve plug 134 pivotal over a total range 166 of at least ten degrees relative to the brace 126 when the valve plug 134 is spaced apart from the valve seat 122. Some examples of the connector 132 include a ball-and-socket device, a universal joint, pivotal eyebolts, pivotal clevises, etc. In some examples, the connector 132 is a ball-and-socket device for maximum pivotal accuracy. One example of such a ball-and-socket device is a model RBI8D rod end bearing—link ball, male threaded holder, RBI Series offered by MiSUMi of Schaumburg, Illinois.

In some examples, the valve plug 134 is attached to the strut's outer cylinder 130*b*, while the inner rod 130*a* is attached to the connector 132. In such an arrangement, the spring 152 urging the strut 130 to its retracted length 150*b* further urges the valve plug 134 from its unsealed position spaced apart from the valve seat 122 (FIGS. 16-19 and 21) to its sealed position engaging the valve seat 122 (FIGS. 15 and 20).

Figure 16:
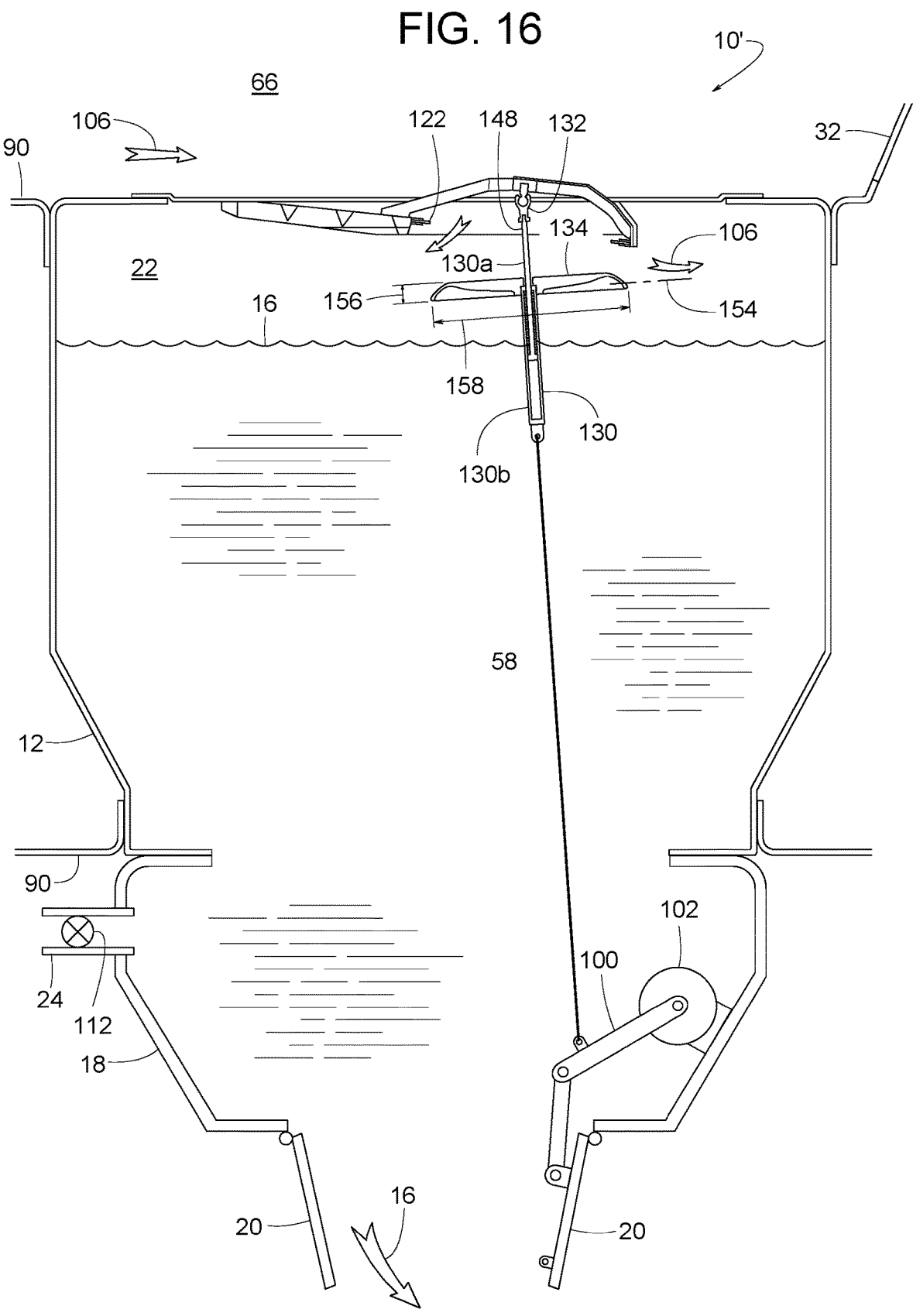
FIG. 16 is a cross-sectional side view similar to FIG. 15 but showing the vent fully open in response to the gate valve assembly being open.
Figure 17:
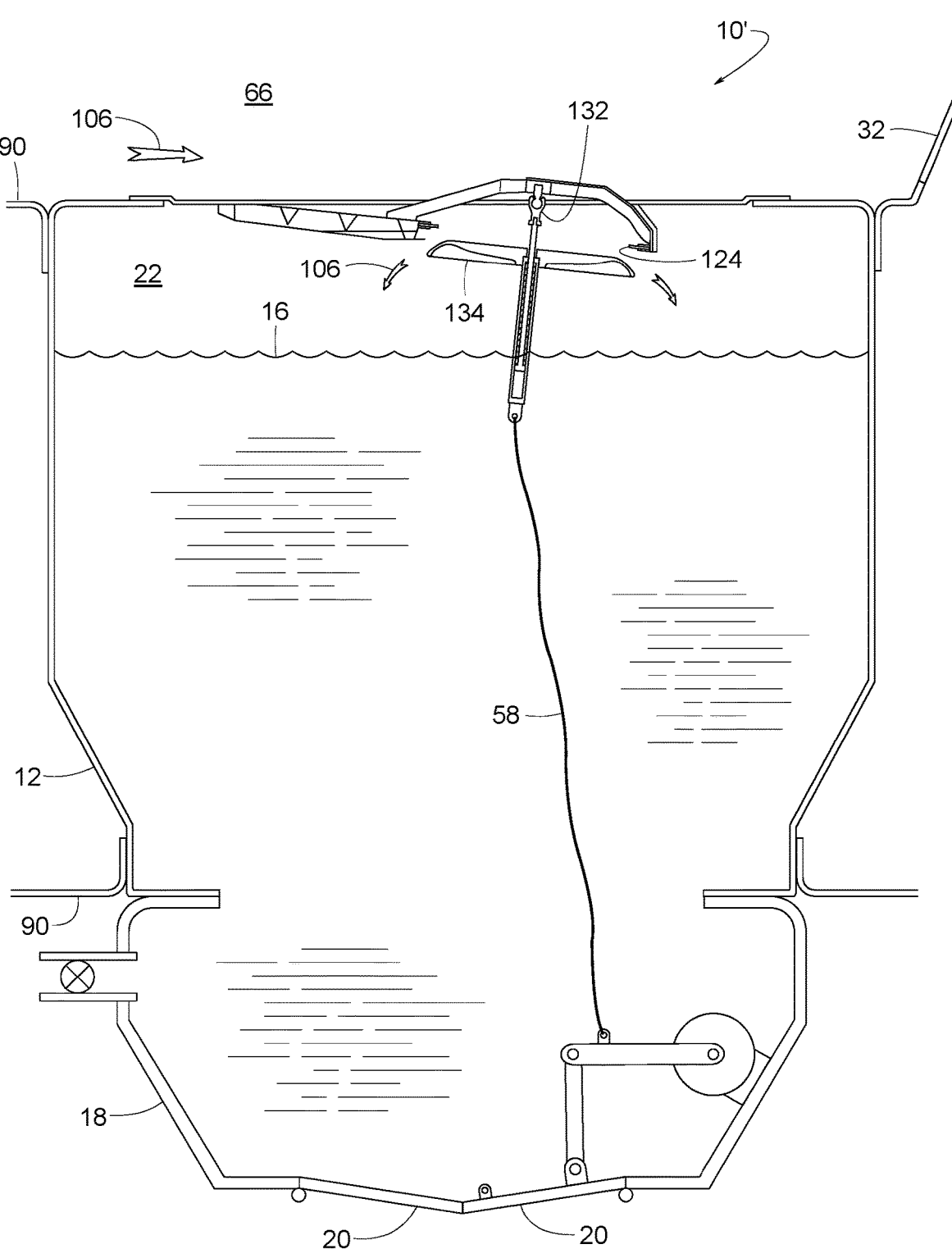
FIG. 17 is a cross-section side view similar to FIG. 15 but showing the vent open in response to a pressure differential across the valve plug.
Figure 18:
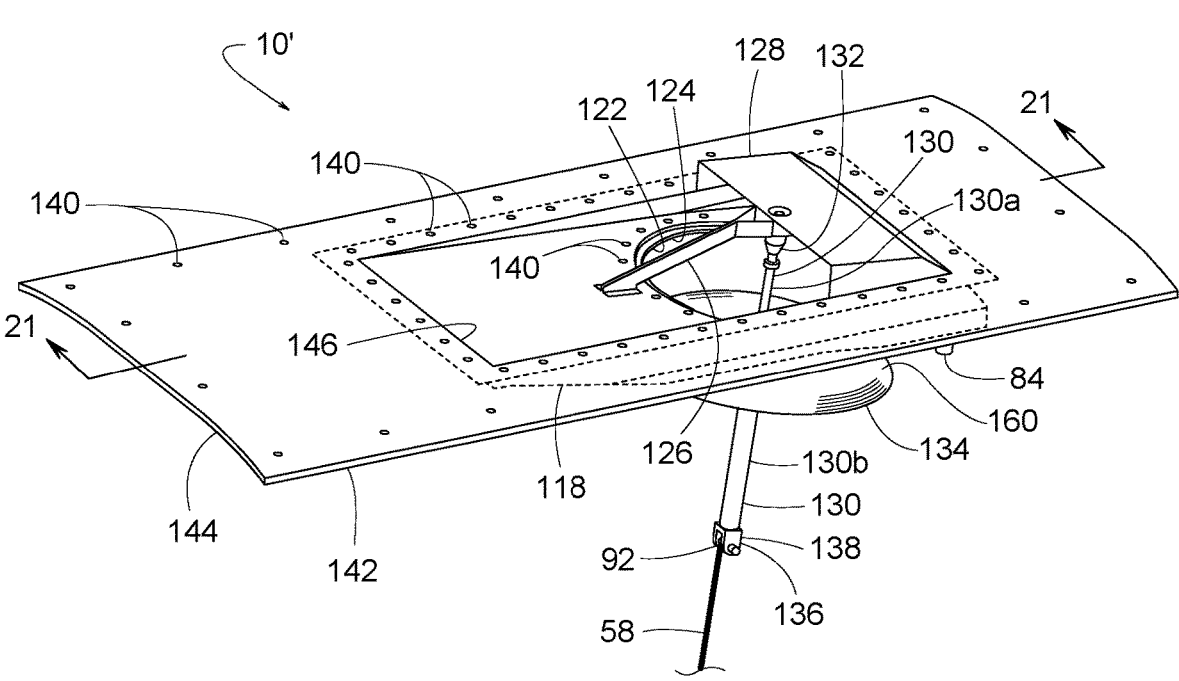
FIG. 18 is a perspective top view of the vent system shown in FIGS. 15-17 and 20-22, and with the vent in FIG. 18 shown open.
Figure 19:
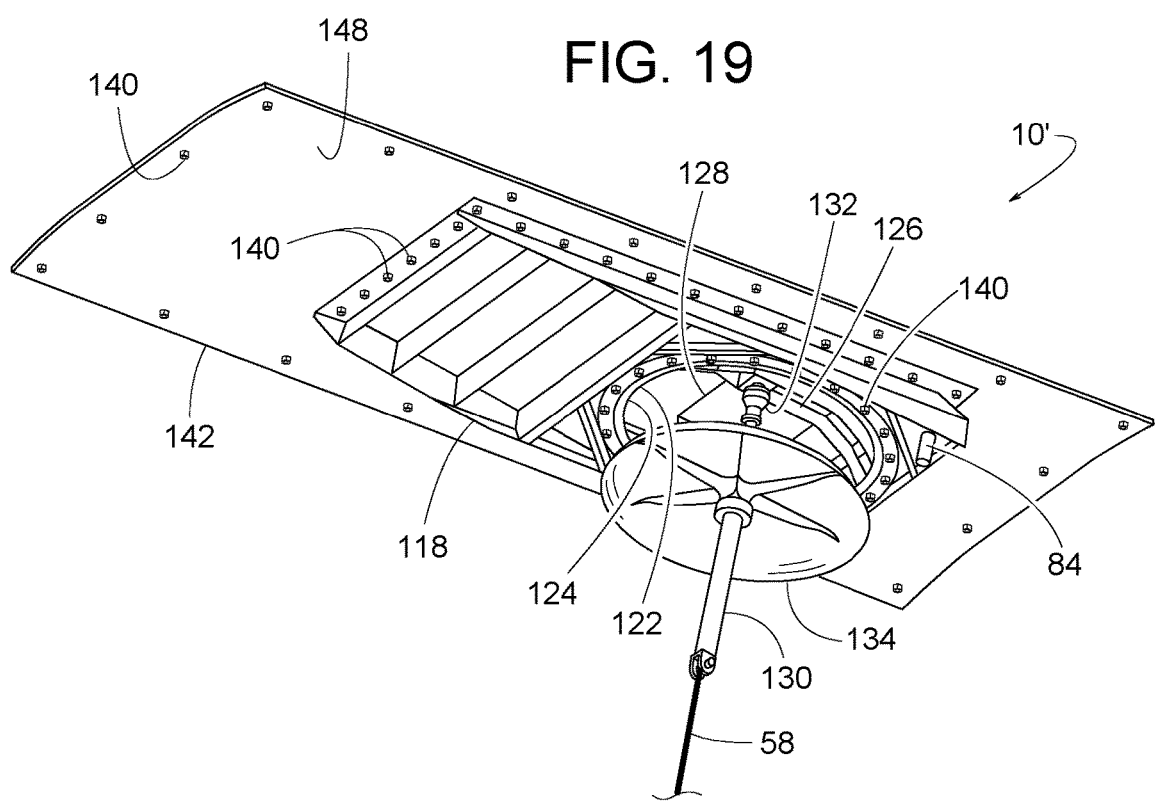
FIG. 19 is a perspective bottom view of the vent system shown in FIG. 18.

The force of the spring 152 urging the valve plug 134 closed, however, can be overcome in two ways. A first way is when an air pressure differential across the valve plug 134 forces the valve plug 134 to its unsealed position, as shown in FIG. 17, thereby relieving negative pressure within the tank 12. A sufficient air pressure differential can open the vent regardless if the gate valve assembly 18 is open or closed. A second way is when the gate valve assembly 18 opens, as shown in FIG. 16, thereby creating tension in the slender member 58 that pulls the valve plug 134 away from the valve seat 122.

Some examples of the slender member 58 include the tension-limiting spring 116, as shown in FIGS. 11-14. In some examples, when the tank 12 is full and the level of the liquid 16 is at or above the valve seat 122, the valve plug 134 sealed against the valve seat 122 helps prevent the liquid 16 from leaking up through the aperture 124.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A vent system in combination with an aircraft that can disperse a fluid while in-flight, the aircraft includes a fuselage supporting a nose, a tail, and a cockpit with a windshield; the aircraft defining a roll axis, a pitch axis, and a yaw axis; the aircraft extending lengthwise along the roll axis in a forward direction from the tail to the nose, the aircraft extending widthwise along the pitch axis, the aircraft extending along the yaw axis in an upward direction from a lower portion of the aircraft to an upper portion of the aircraft, the cockpit being between the tail and the nose with respect to the roll axis; the roll axis, the yaw axis, and the pitch axis lying perpendicular to each other, the vent system in combination with the aircraft comprising:

a tank supported by the fuselage, the tank being between the cockpit and the nose, the tank defining a chamber for containing the fluid;

a gate valve assembly underneath the tank and in fluid communication with the chamber, the gate valve assembly includes a gate that is movable selectively to an open position to release the fluid from the tank and a closed position to retain the fluid within the tank;

a vent frame at an upper area of the tank above the gate valve assembly;

a valve seat supported by the vent frame above the gate valve assembly, the valve seat defining an aperture between the chamber and an outside atmosphere surrounding the aircraft;

a brace supported by the vent frame and extending over the aperture;

a hood supported by the brace and extending at least partially over the aperture;

a strut extending through the aperture;

a connector pivotally coupling an upper end of the strut to the brace; and a valve plug attached to the strut, the valve plug being movable selectively to a sealed position engaging the valve seat and an unsealed position spaced apart from the valve seat, the valve plug blocking fluid communication through the aperture when the valve plug is in the sealed position, the aperture placing the chamber in open fluid communication with the outside atmosphere when the valve plug is in the unsealed position, the valve plug having a plug outer diameter, a plug mass, and a diameter/mass ratio of the plug outer diameter divided by the plug mass, wherein the diameter/mass ratio is greater than 20 cm/kg.

2. The vent system of claim 1, wherein the strut is extendible to provide a variable length between the upper end and the lower end of the strut.

3. The vent system of claim 1, wherein the connector pivotally coupling the upper end of the strut to the brace renders the strut pivotal over a total range of at least ten degrees relative to the brace when the valve plug is spaced apart from the valve seat.

4. The vent system of claim 1, wherein the connector is a ball-and-socket device that renders the strut pivotal over a total range of at least ten degrees relative to the brace when the valve plug is spaced apart from the valve seat.

5. The vent system of claim 1, further comprising a hatch cover at the upper area of the tank, the hatch cover including an inner periphery fastened to the vent frame, and the hatch cover including an outer periphery fastened to the tank.

6. The vent system of claim 1, further comprising a hatch cover at the upper area of the tank, the hatch cover including an outer periphery and an inner periphery, the outer periphery is fastened to the tank, and the vent frame is fastened to an underside of the hatch cover.

7. The vent system of claim 1, wherein the valve plug has a plug thickness and a plug ratio, wherein the plug ratio is the outer diameter of the plug divided by the plug thickness, and the plug ratio is greater than five.

8. The vent system of claim 1, wherein the valve plug includes a frusto-spherical structure.

9. The vent system of claim 1, wherein the valve plug includes a frustoconical structure.

10. The vent system of claim 1, wherein the valve plug is non-buoyant.

11. The vent system of claim 1, wherein a combination of the vent frame, the valve seat, the brace, the hood, the strut, the connector and the valve plug has a combined weight of less than 12 kg.

12. The vent system of claim 1, further comprising a hatch cover at the upper area of the tank, the hatch cover including an inner periphery fastened to the vent frame, the hatch cover including an outer periphery fastened to the tank, wherein the hatch cover is made of fiberglass, the valve plug includes an aluminum alloy, while the vent frame, the hood, the brace, and the strut includes a stainless steel alloy.

13. The vent system of claim 1, further comprising a slender member having a length and a width, the length being at least ten times greater than the width, the slender member coupling the strut to the gate valve assembly such that the gate moving between the closed position and the open position causes the valve plug to move respectively between the sealed position and the unsealed position.

14. The vent system of claim 13, wherein the strut is extendible from a retracted length to an extended length, the strut includes a spring urging the strut to the retracted length, the spring urging the valve plug against the valve seat in the sealed position when the gate is in the closed position, the slender member overpowering the spring to hold the valve plug at the unsealed position when the gate is in the open position.

15. The vent system of claim 13, wherein the strut includes an inner rod and an outer tube that render the strut extendible from a retracted length to an extended length, the strut includes a spring within the tube to urge the strut to the retracted length, the spring urges the valve plug against the valve seat in the sealed position when the gate is in the closed position, the slender member overpowers the spring to hold the valve plug at the unsealed position when the gate is in the open position.

\* \* \* \* \*